Figure 1:
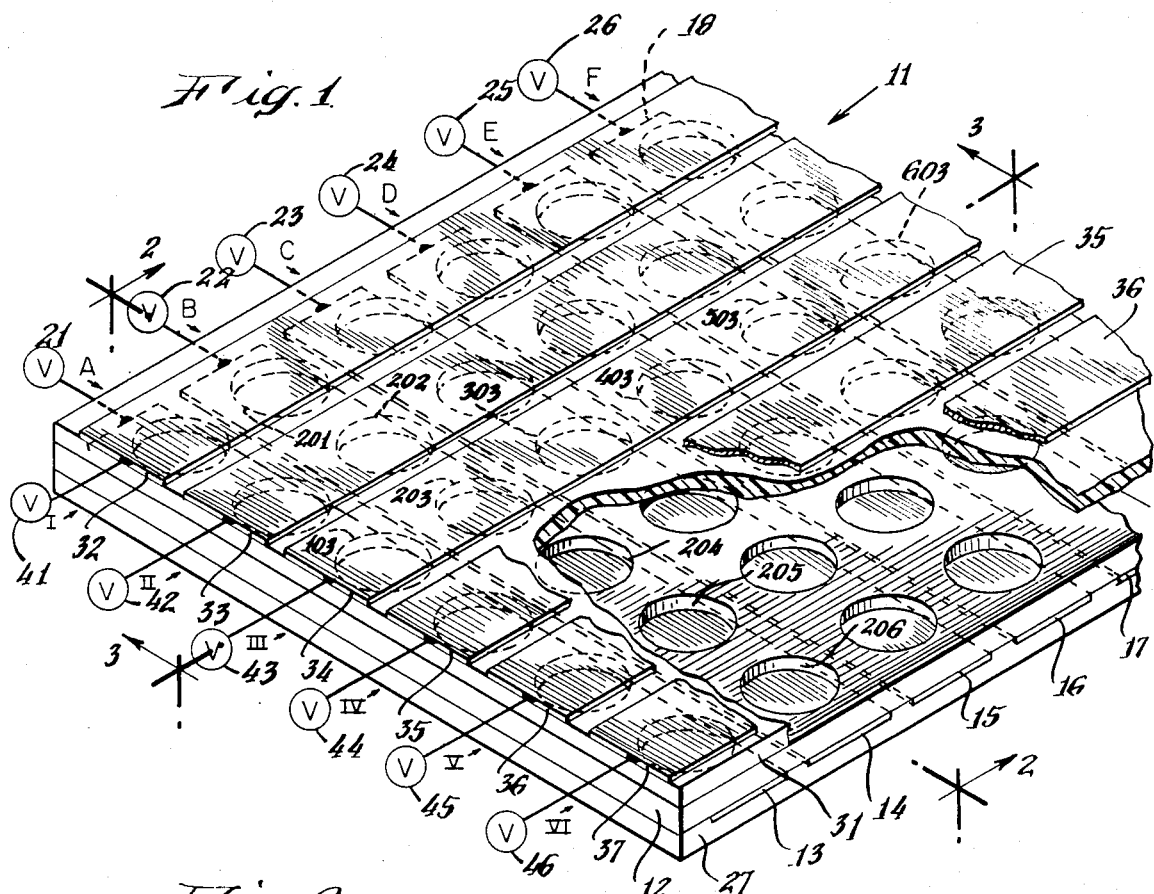

United States

Preston, Jr. et al.

[11] 3,796,480

[45] Mar. 12, 1974

[54] MEMBRANE LIGHT MODULATOR

[75] Inventors: Kendall Preston, Jr., New Haven; Julian Wasserman, Norwalk; Edward T. Siebert, Danbury, all of Conn.

[73] Assignee: The Perkin-Elmer Corporation, Norwalk, Conn.

[22] Filed: Dec. 26, 1968

[21] Appl. No.: 786,926

[52] U.S. Cl. .............................................. 350/161
[51] Int. Cl. ............................................... G02f 1/28
[58] Field of Search ................. 350/161, 160, 160 R

[56] References Cited
UNITED STATES PATENTS

| | | | |
|---|---|---|---|
| 3,499,112 | 3/1970 | Heilmeier et al. | 350/161 |
| 2,281,637 | 5/1942 | Sukumlyn | 350/161 |
| 2,289,205 | 7/1942 | Nagy et al. | 350/161 X |
| 3,001,447 | 9/1961 | Ploke | 350/161 |
| 3,137,762 | 6/1964 | Baumgartner et al. | 350/161 |
| 3,306,160 | 2/1967 | Dinhobel et al. | 350/161 X |
| 3,463,572 | 8/1969 | Preston | 350/161 |
| 3,479,109 | 11/1969 | Preston | 350/161 |

FOREIGN PATENTS OR APPLICATIONS

822,866  10/1937  France .............................. 350/161

*Primary Examiner*—Ronald L. Wibert
*Assistant Examiner*—V. P. McGraw
*Attorney, Agent, or Firm*—John K. Conant

[57] ABSTRACT

A collodion membrane coated with a plurality of spaced apart, reflective and conductive strips is stretched across a glass plate having an array of holes. The holes are arranged in rows and columns. Each strip is located over one row of holes. A separate electrode is located underneath each column of holes. Electric signals applied to the strips and electrodes produce electrostatic deflections in the portions of the membrane above the holes; the deflection over any one hole being dependent on the signal applied to the strip above the hole and the signal applied to the electrode below the hole. In use a beam of light striking the strips on the membrane is reflected and at the same time phase modulated.

5 Claims, 3 Drawing Figures

PATENTED MAR 12 1974 3,796,480

INVENTOR.
Kendall Preston, Jr.
BY Julian Wasserman
Edward T. Siebert

Irving M. Kriegsman
ATTORNEY.

MEMBRANE LIGHT MODULATOR

This invention relates to light modulators. More particularly, this invention relates to light modulators in which the surface contour of a deformable reflective element or medium is selectively altered by electrical or electromagnetic signals so as to spatially phase modulate a beam of light impinging on the deformable surface and reflected therefrom.

Light modulators of this type are now well known in the art and commonly used in optical communication systems, display systems, television systems and a variety of other applications where modulating the phase of a beam of light spatially (and/or temporally) is either desired or required. In the book "Television, The Electronics of Image Transmission in Color and Monochrome," Second Edition, V. K. Zworken and G. A. Morton, Copyright 1940 and 1954, John Wiley and Sons, Inc.; New York, on pages 284–287 there is described a light modulator in which the deformable medium is a reflective coated viscous film. The film is supported on a glass disc and is scanned by a modulated electron beam which produces corresponding changes in the thickness and hence, the contour of the film surface. In British Patent 778,376 to J. H. Jeffree, there is disclosed another light modulator of this general type. Several different embodiments are shown. In all embodiments electrostatic charges set up in a support member cause an electrostatic attraction of a reflective and conductive film resting on top of the support member. In U.S. Pat. Nos. 3,479,109 dated Nov. 18, 1969 and 3,463,572 dated Aug. 26, 1969 to the assignee of this application, there is disclosed a light modulating device of this general type in which localized deflections in a reflective and conductive coated membrane are produced by establishing individual isolated electrostatic charges in the wells of the support member on which the membrane rests.

It is an object of this invention to provide a new and improved light modulator.

It is another object of this invention to provide a new and improved membrane type light modulator.

It is still another object of this invention to provide a light modulator which can be used to spatially and/or temporally phase modulate a beam of light.

It is yet still another object of this invention to provide a new and improved technique for producing localized deflections in a membrane.

It is another object of this invention to provide a technique for producing localized electrostatic deflections in a membrane in which the number of different deflections produced is much greater than the number of different electrical signal sources used to produce the electrostatic charges.

The above and other objects are achieved by constructing a light modulator according to this invention. The light modulator includes a rigid nonconductive member having an array of holes. The holes are arranged in rows and columns. Located underneath each row of holes is an electrode. The light modulator further includes a nonconductive membrane stretched across the top of the rigid nonconductive member. A plurality of spaced apart reflective and conductive strips are formed on the membrane. Each strip is positioned so as to extend over one column of holes. Deflections in the membrane are produced by applying electric signals to the conductive strips on the membrane and the electrodes underneath the rigid nonconductive member. The deflections occur at the portions of the membrane and reflective strips thereon extending over the holes and thereby phase modulate portions of a beam of light reflected from the portions of the reflective strips over the holes. The particular deflection at any one hole is dependent solely on the signal applied to the conductive strip on the membrane above the hole and the signal on the electrode underneath the hole. One feature of the invention is that different or independent deflections over $n^2$ holes can be realized by using only $2n$ voltage sources. Another feature of the invention is that the deflections on the membrane are extremely localized.

Figure 2:
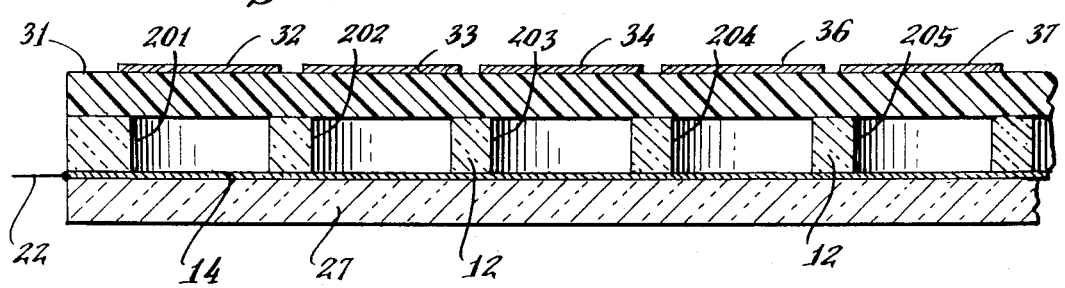
Figure 3:
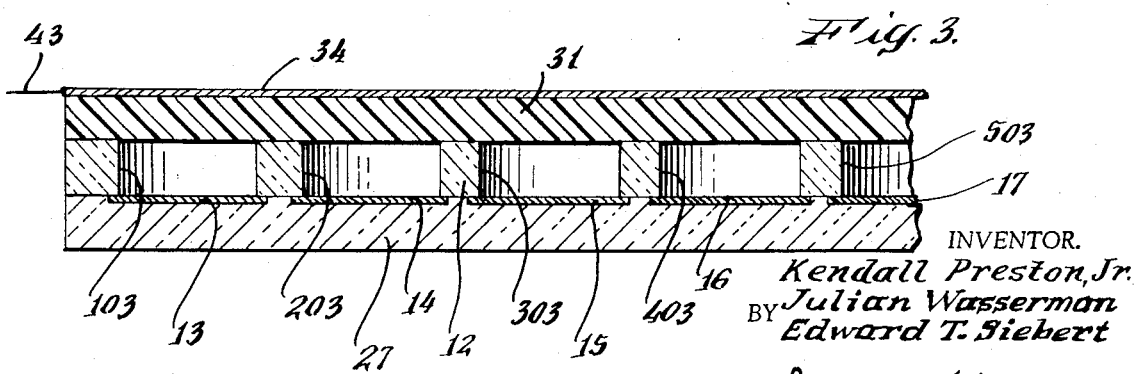

Other features and advantages of the invention will become apparent on reading the following detailed description taken in connection with the accompanying drawings in which like reference characters represent like parts and wherein:

FIG. 1 is a perspective view of a light modulator constructed according to this invention, FIG. 2 is a section view of the light modulator of FIG. 1 taken along lines 2—2, and FIG. 3 is a section view of the light modulator of FIG. 1 taken along lines 3—3.

Referring now to the drawings, there is shown a light modulator designated by reference numeral 11.

The light modulator 11 includes a plate 12 having an array of holes. The plate 12 is made of rigid nonconductive material such as glass. The holes are aligned in rows and colums. In order to identify the different rows and columns in the drawings, the rows are labeled A, B, C, D, E and F and the columns are labeled I, II, III, IV, V and VI. Additionally, the holes in row B are numbered 201, 202, 203, 204, 205 and 206 and the holes in column III are numbered 103, 203, 303, 403, 503 and 603. Each hole is in one row and one column. For example, hole 203 lies in row B and column III. Located underneath plate 12 is a plurality of electrodes 13 through 18. Each electrode is positioned so that it passes underneath one row of holes. For example, electrode 14 passes underneath row B. The light modulator 11 further includes a set of voltage sources 21 through 26. Each voltage source is connected to a different electrode. Plate 12 and electrodes 13 through 18 rest on a support member 27 of nonconductive material such as glass. Stretched across the top surface of plate 12 is a thin membrane 31 of collodion or other similar nonconductive deformable material. The membrane 31 is coated with a plurality of spaced apart reflective and conductive strips 32 through 37. The strips are arranged so that each strip is located over one column of holes. Thus, as can be seen in the drawing, strip 34 extends over column III. The light modulator 11 further includes a second set of voltage sources 41 through 46. Each voltage source is connected to a separate strip.

Deflections in the membrane 31, and hence deflections of the reflective portions thereof, are produced by activating the voltage sources. The deflections, which are electrostatically induced, are confined to those portions of the membrane 31 directly above the holes. The amount of deflection of the membrane 31 over any one hole is dependent on the voltage signal on the conductive strip extending over any particular hole and the voltage signal on the electrode located underneath the hole. If the signals are d.c., the deflection is dependent on their potential difference. If the signals are a.c., the deflection is dependent on their potential difference and also on their sum and difference frequencies. Thus, for example, the deflection of the portion of the membrane extending over hole 403 is dependent on voltage sources 24 and 43.

By the proper selection of voltage sources, it is possible to obtain a different deflection of the membrane at each hole. One convenient technique for achieving this is by having all the voltage sources different (in size if d.c. or size and/or frequency if a.c.) and by having all the voltage sources in one set different multiples of one discrete unit more than the largest voltage source in the other set. For example, voltage sources 21 through 26 could be 1 through 6 volts d.c. (in any order) and voltage sources 41 through 46 could be 7, 14, 21, 28, 35 and 42 volts d.c. (also in any order). If a.c. signals are used, the difference need only be in terms of frequencies. For example, one set of voltages could be 10, 20, 30, 40, 50 and 60 cycles a.c. and the other set 70, 140, 210, 280, 350 and 420 cycles a.c.

It is to be understood that the number of rows and columns shown in the drawings is only by way of illustration and for simplicity. In actual practice, each row and column may contain as many as several hundred holes.

In the embodiment described above, the strips coated on the membrane are light reflecting and electrically conducting. As an alternate arrangement, the membrane could be reflection coated over its entire surface and conductive coated with strips provided that the reflective coating is not electrically conductive. Also, as another alternative arrangement, the electrodes 13 through 18 could be located underneath the substrate 27 and electrically connected to individual electrodes located in each hole.

Obviously, many other alterations and modifications will become apparent to those skilled in the art. It is, therefore, to be understood that the scope of this invention is as defined in the appended claims.

What is claimed is:
1. A light modulator for use in modulating the phase of a beam of light incident thereon comprising:
   a. a rigid plate of nonconductive material having an array of holes arranged in rows in one direction and columns in another direction;
   b. a plurality of electrodes located underneath the plate, each electrode passing underneath one column of holes;
   c. a nonconductive membrane stretched across the top of the plate;
   d. a plurality of spaced apart reflective and conductive strips on said membrane, arranged so that each strip passes over one row of holes on the plate;
   e. means connecting voltage sources to the strips for establishing a different electric charge on each of the strips; and
   f. means connecting voltage sources to the electrodes for establishing a different electric charge on each of the electrodes;
   whereby the deflection of the membrane in the vicinity of each hole is dependent solely on the electric charge on the electrode underneath the hole and the electric charge on the strip on the membrane above the hole.

2. The invention according to claim 1 and wherein the membrane is made of collodion.

3. The invention according to claim 1 and wherein the columns and rows are in straight lines and the columns are at right angles relative to the rows.

4. The invention according to claim 1 and wherein the electric signals applied to each electrode and each strip are different.

5. The invention according to claim 4 and wherein the electric signal applied to each electrode is a different frequency and the electric signal applied to each strip is a different multiple of a frequency greater than the highest frequency applied to any one of the electrodes.

* * * * *